(12) United States Patent
Kawada et al.

(10) Patent No.: US 7,245,719 B2
(45) Date of Patent: Jul. 17, 2007

(54) RECORDING METHOD AND APPARATUS, OPTICAL DISK, AND COMPUTER-READABLE STORAGE MEDIUM

(75) Inventors: Hirotsugu Kawada, Sakai (JP); Noboru Katta, Itami (JP); Katsuhiko Miwa, Moriguchi (JP); Yoshihiro Mori, Hirakata (JP); Masaaki Takata, Hirakata (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 575 days.

(21) Appl. No.: 09/893,504

(22) Filed: Jun. 29, 2001

(65) Prior Publication Data

US 2002/0001385 A1   Jan. 3, 2002

(30) Foreign Application Priority Data

Jun. 30, 2000   (JP) .............................. 2000-199551

(51) Int. Cl.
*H04N 7/167* (2006.01)
*G06F 12/14* (2006.01)
*G11B 7/24* (2006.01)

(52) U.S. Cl. ........................ 380/201; 713/193; 705/57; 720/718

(58) Field of Classification Search ................ 713/193; 380/201; 705/57; 720/718
See application file for complete search history.

(56) References Cited

U.S. PATENT DOCUMENTS 5,513,260 A * 4/1996 Ryan .......................... 380/200
5,639,585 A * 6/1997 Callahan et al. ............. 430/140
5,740,246 A * 4/1998 Saito ............................ 705/52
5,999,696 A * 12/1999 Tsuga et al. .................. 386/98
6,141,772 A * 10/2000 Hashimoto .................... 714/16
6,223,285 B1 4/2001 Komuro et al. .............. 713/160
6,393,202 B1 * 5/2002 Yamauchi et al. ............. 386/95
6,393,206 B1 * 5/2002 Yagi et al. ................... 386/125
6,477,127 B1 * 11/2002 Osada et al. .............. 369/59.25
6,574,419 B1 * 6/2003 Nonomura et al. ........... 386/95
6,615,160 B1 * 9/2003 Quinnett et al. ............ 702/185
6,647,496 B1 * 11/2003 Tagawa et al. .............. 713/193
6,694,023 B1 * 2/2004 Kim ........................... 380/203
6,738,559 B1 * 5/2004 Yoo et al. ...................... 386/46
6,832,319 B1 * 12/2004 Bell et al. ................... 713/193
6,886,098 B1 * 4/2005 Benaloh ...................... 713/193
2001/0006771 A1 * 7/2001 Kajiyama et al. ........ 434/307 A
2001/0042043 A1 * 11/2001 Shear et al. ................... 705/51
2002/0085042 A1 * 7/2002 Matthews et al. ........... 345/810
2003/0105718 A1 * 6/2003 Hurtado et al. ............... 705/51
2003/0133692 A1 * 7/2003 Hunter ......................... 386/35

* cited by examiner

*Primary Examiner*—Nasser Moazzami
*Assistant Examiner*—Eleni Shiferaw
(74) *Attorney, Agent, or Firm*—Wenderoth, Lind & Ponack, L.L.P.

(57) ABSTRACT

A recording apparatus records movie content onto a DVD. The movie content is encrypted using a different encryption method depending on whether the DVD is intended for consumer use or industrial use. If the DVD is for consumer use, a VIDEO_TS directory is created on the DVD, and the encrypted movie content is recorded in the VIDEO_TS directory. If the DVD is for industrial use, a VIDEO_TS directory and an EWCPS_TS directory are created on the DVD, and the encrypted movie content and message data are recorded respectively in the EWCPS_TS directory and the VIDEO_TS directory. The message data indicates that the movie content cannot be played back by consumer DVD players.

4 Claims, 17 Drawing Sheets

FIG. 8
EWCPS-DVD (INDUSTRIAL DVD)  VIDEO_TS DIRECTORY
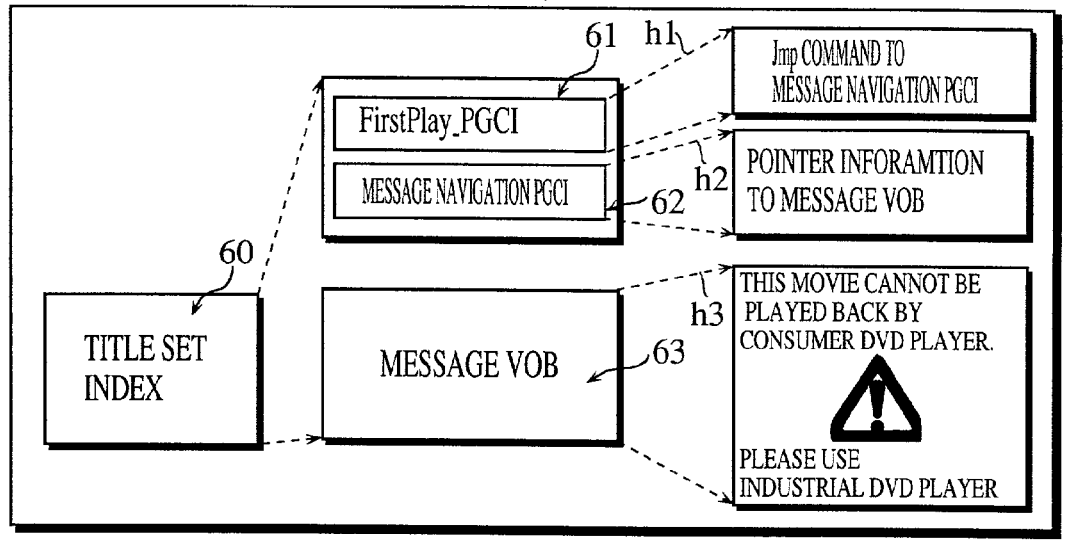
EWCPS_TS DIRECTORY
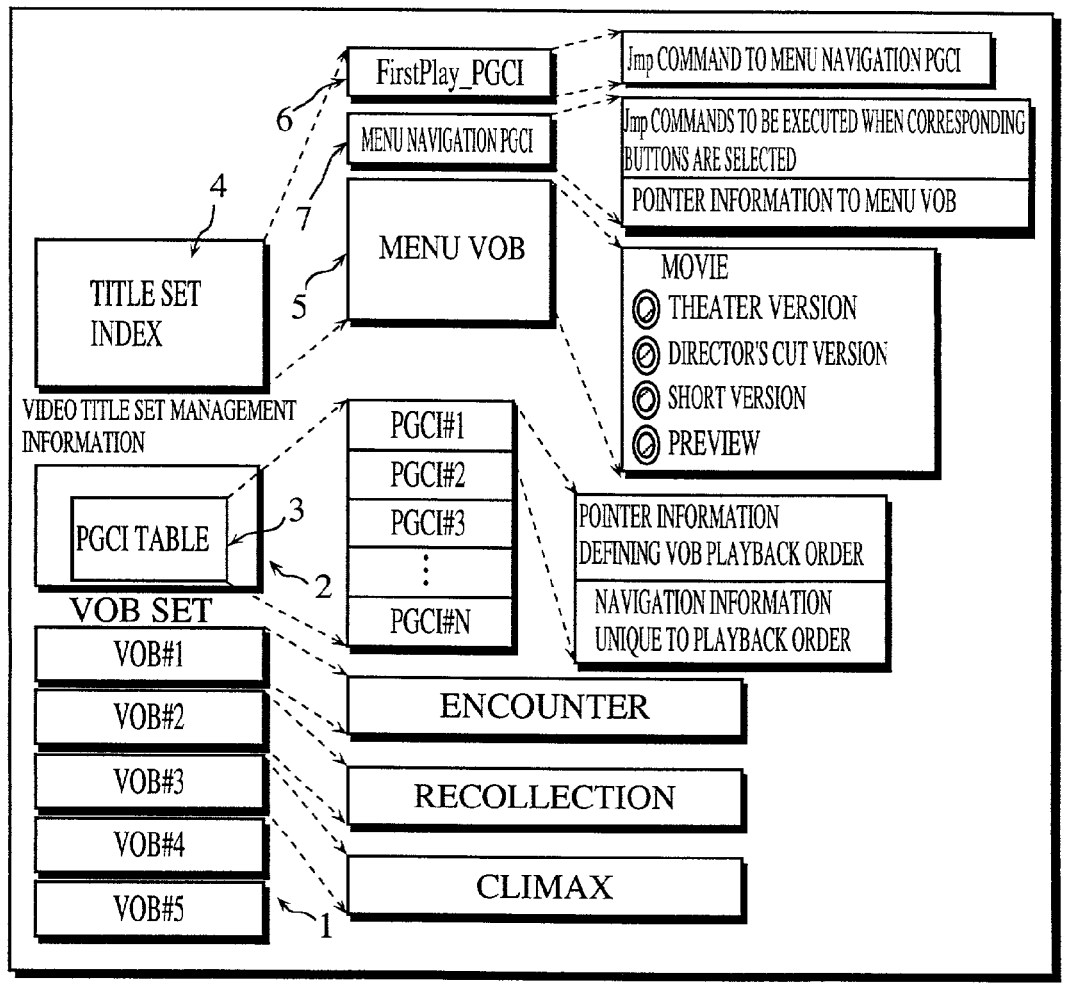

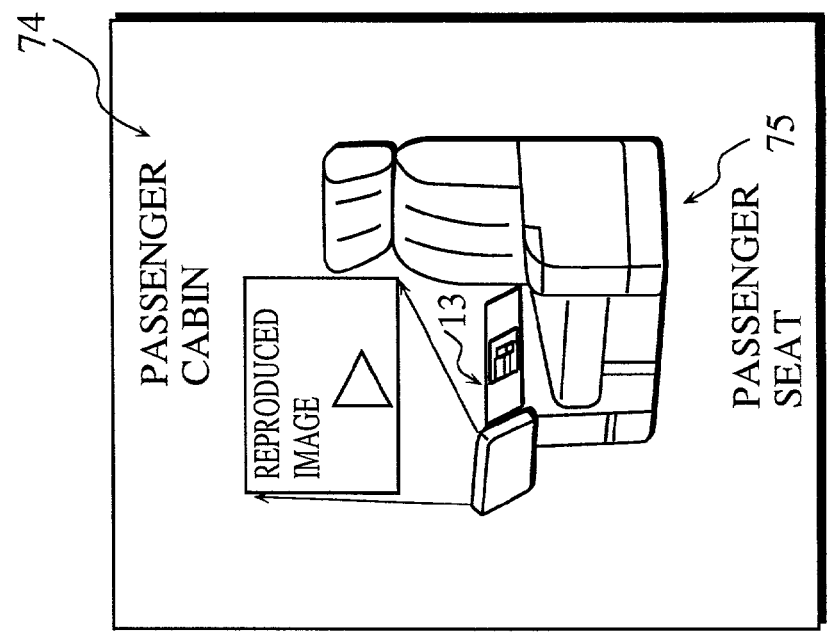
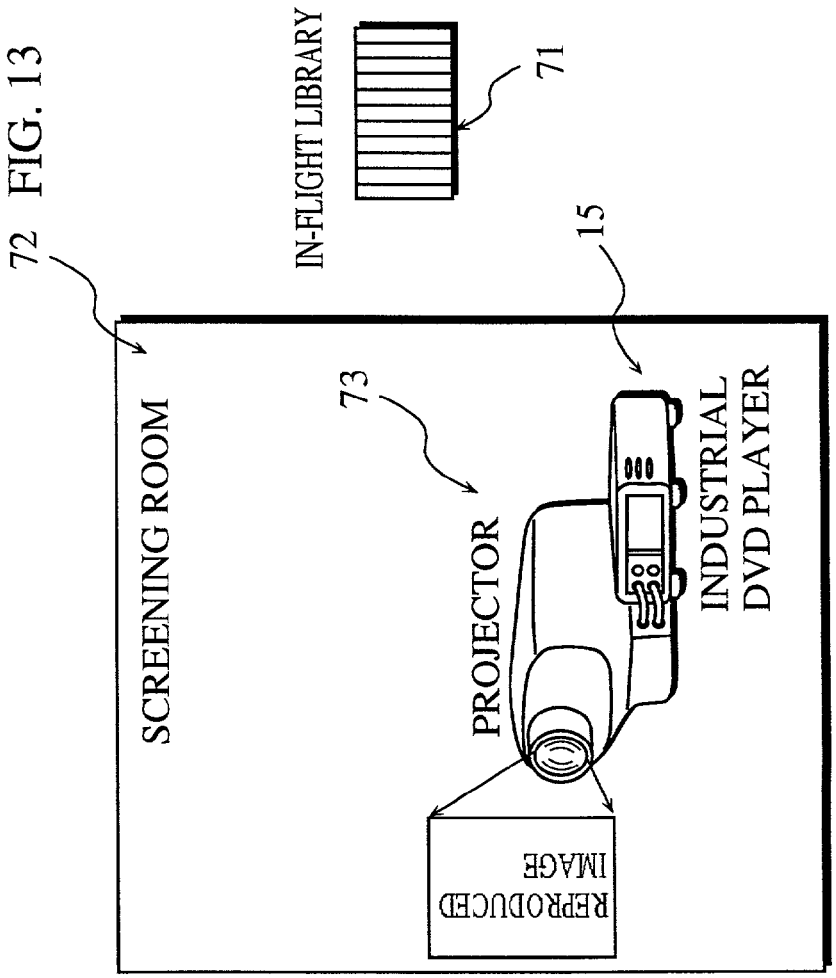
FIG. 13

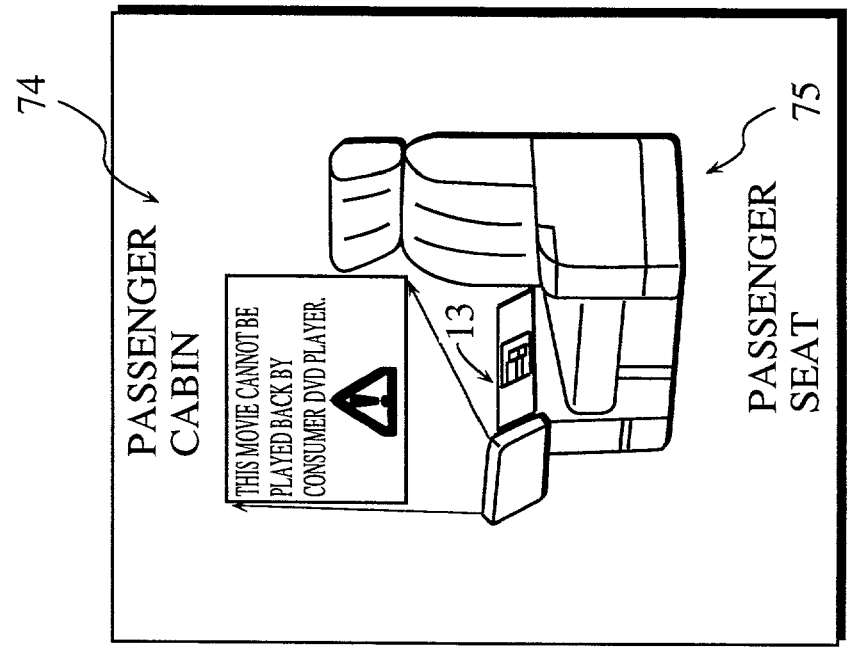
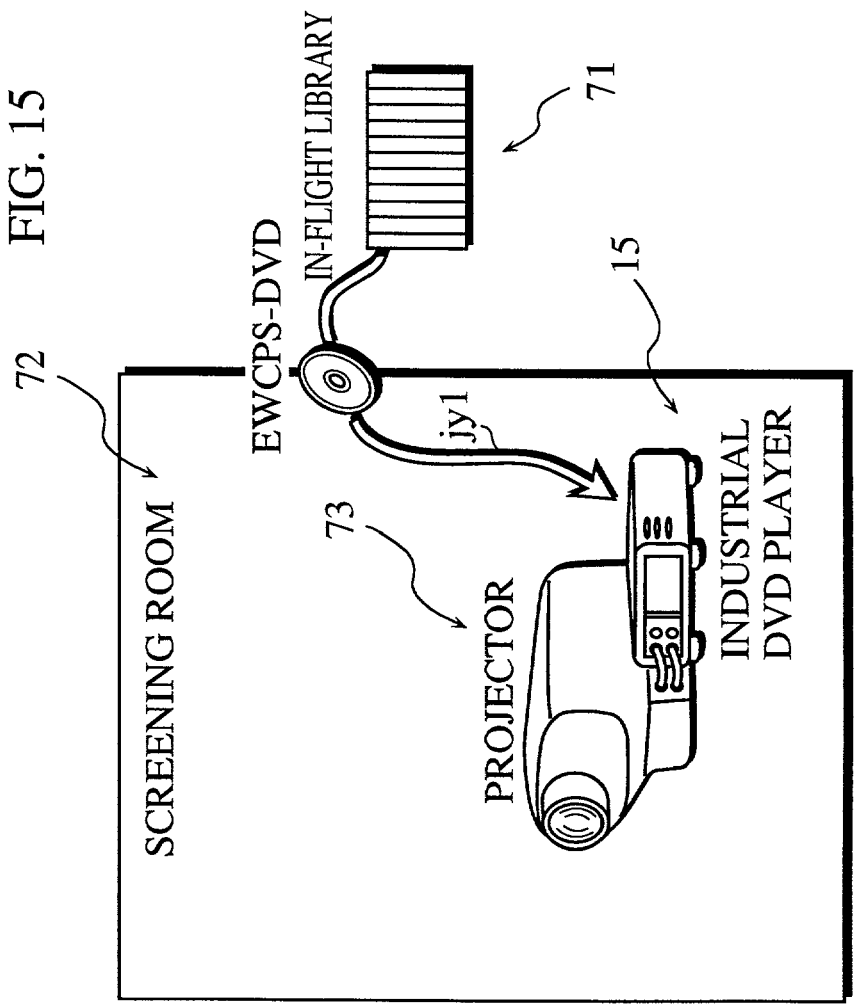
FIG. 15

RECORDING METHOD AND APPARATUS, OPTICAL DISK, AND COMPUTER-READABLE STORAGE MEDIUM

This application is based on application No. 2000-199551 filed in Japan, the content of which is hereby incorporated by reference.

BACKGROUND OF THE INVENTION

1. Field of the Invention

The present invention relates to an apparatus for recording copyrighted content onto optical disks, and, in particular, relates to improvements when different formats are used for industrial-use optical disks and consumer-use optical disks.

2. Background Art

DVDs, which have become representative optical disks nowadays, can be classified into two types, namely, consumer DVDs available to general consumers and industrial DVDs available only to specific industries. The latter DVD records, for example, content of a movie film which is currently showing at theaters, and is intended not for home use, but for public use. With the development of industrial DVDs, the media for distributing movie content for industrial use are expected to shift from films and tapes to DVDs.

Since content of a movie which is currently showing at theaters is recorded on a DVD for industrial use, such as in-flight screening, if such a DVD is stolen or lost, the copyright holder of the movie content will suffer tremendous damages. This is because if the industrial DVD is stolen or lost and acquired by a third party, the third party can show the movie content recorded on the DVD in an area where the release of the movie is scheduled, without permission of the copyright holder. When this happens, the copyright holder cannot earn an intended profit at the box office. Besides, the airline company has to pay the copyright holder compensation for the damages caused by the theft or loss. This could deteriorate the relationship between the copyright holder and the airline company. To avoid such a problem, when recording the movie content onto the industrial DVD, the copyright holder subjects the movie content to encryption which differs with that of the consumer DVD, to prevent the movie content recorded on the industrial DVD from being played back by DVD players other than industrial DVD players. Since consumer DVD players cannot play back the movie content recorded on the industrial DVD, even if the industrial DVD is stolen or lost, the movie content will not be shown without permission of the copyright holder.

However, the above consideration for copyright protection can lead to another problem on the airplane. Given that consumer DVDs are likely to be carried in the airplane together with industrial DVDs, if the industrial DVDs and the consumer DVDs are stored haphazardly, an industrial DVD may be mistaken for a consumer DVD, taken not to the in-flight screening room, but to the passenger cabin, and loaded to a consumer DVD player equipped in a passenger seat. Since the industrial DVD has been encrypted using a different cipher, it cannot be played back by the consumer DVD player. However, the passenger in the seat would not know the reason why the movie content cannot be played back, and may complain that the DVD player is faulty. It is undesirable for the airline company to give the impression that equipped devices are faulty. Also, flight attendants do not want to be disturbed by such a complaint.

SUMMARY OF THE INVENTION

Hence, the object of the present invention is to provide a recording apparatus that records copyrighted digital content onto an optical disk, so as not to confuse a user even if the optical disk is loaded to a reproduction apparatus which is not designed for reproducing the optical disk.

The stated object can be achieved by a recording apparatus for recording digital content onto an optical disk, including: an accepting unit operable to accept from a user an indication whether the optical disk is intended for consumer use or industrial use; an encrypting unit operable to encrypt the digital content, using a different encryption method depending on whether the optical disk is intended for consumer use or industrial use; a first writing unit operable to, when the optical disk is intended for consumer use, (a) generate a first area on the optical disk, and (b) write the encrypted digital content to the first area; and a second writing unit operable to, when the optical disk is intended for industrial use, (a) generate a first area and a second area on the optical disk, (b) write the encrypted digital content to the second area, and (c) write message data to the first area, wherein the message data indicates that the digital content cannot be reproduced by a consumer reproduction apparatus.

With this construction, when the optical disk is for industrial use, the encrypted digital content is written in the second area, and the message data indicating that the digital content cannot be played back by consumer reproduction apparatuses is written in the first area. This being so, even if someone loads the optical disk to a consumer reproduction apparatus by mistake, he or she will not suspect the reproduction apparatus to be faulty. For instance, even if a passenger loads such an optical disk to a consumer reproduction apparatus equipped in an airplane, the passenger will not suspect the reproduction apparatus to be faulty. As a result, the in-flight operations can be conducted more smoothly.

Here, the encryption method for consumer use may be to encrypt the digital content using a first content key which is to be encrypted using a disk key unique to the optical disk, wherein the encryption method for industrial use is to encrypt the digital content using a second content key which is to be encrypted using a device key unique to an industrial reproduction apparatus.

With this construction, when the optical disk is for industrial use, the copyright protection for the digital content is stronger. Accordingly, copyright holders can provide movie content of high commercial value to airline companies and others through optical disks, without worrying about unauthorized use of the movie content.

Here, the message data may include a plurality of character strings which are each written in a different language, wherein each character string indicates that the digital content cannot be reproduced by the consumer reproduction apparatus.

With this construction, the plurality of character strings written in different languages are included in the message data to indicate that the digital content cannot be played back by consumer reproduction apparatuses. This enables many passengers from different language areas to understand the message.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 8 shows the contents of a VIDEO_TS directory and EWCPS_TS directory on the EWCPS-DVD;

FIG. 13 shows the inside of the airplane where the consumer DVD player and the industrial DVD player are equipped;

FIG. 15 shows the inside of the airplane where the consumer DVD player and the industrial DVD player are equipped;

DESCRIPTION OF THE PREFERRED EMBODIMENTS

First Embodiment

Figure 1:
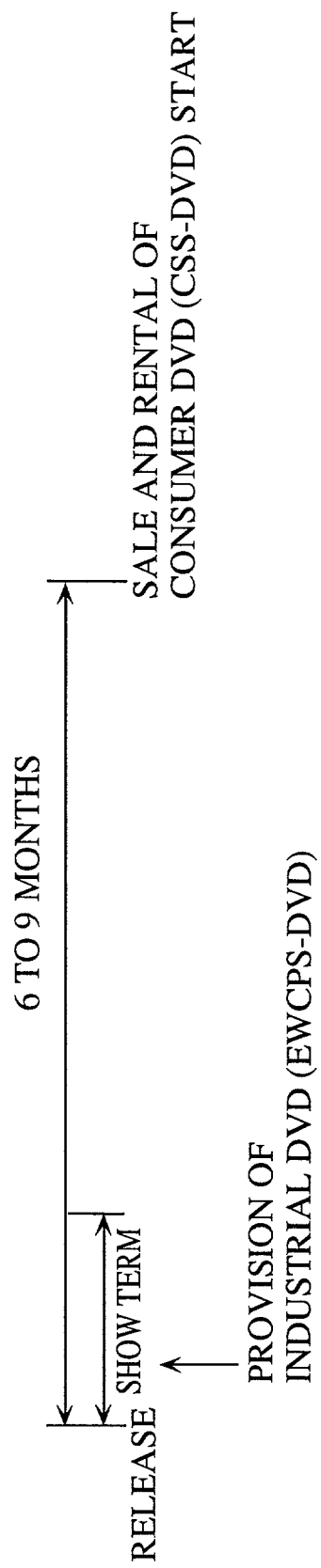
FIG. 1 shows a schedule of distributing movie content by a movie company.

The following describes a recording apparatus according to the first embodiment of the invention, by referring to the drawings. First, move content which is recorded on a DVD by the recording apparatus is explained.

FIG. 1 shows a schedule of distributing the movie content by a movie company. The movie content is recorded on consumer DVDs and introduced on the consumer market, six to nine months after the release of the movie at theaters. The consumer DVDs are then subjected to sale and rental in the consumer market. Thus, the consumer DVDs are put on the market long after the movie's release. On the other hand, industrial DVDs are provided to airline companies or the like, at the same time as the movie's release or during the showing of the movie at theaters. Thus, the industrial DVDs are distributed much earlier than the consumer DVDs, to meet the demand of the industry which wants to show the same movie content as shown at theaters, in public places such as on an airplane. In this specification, a DVD for recording the movie content for industrial use is called "EWCPS-DVD (Early Windows Content Protection System—DVD)", and a consumer DVD "CSS-DVD (Content Scramble System—DVD)". The following description assumes that the EWCPS-DVD is provided for the airline industry.

Figure 2:
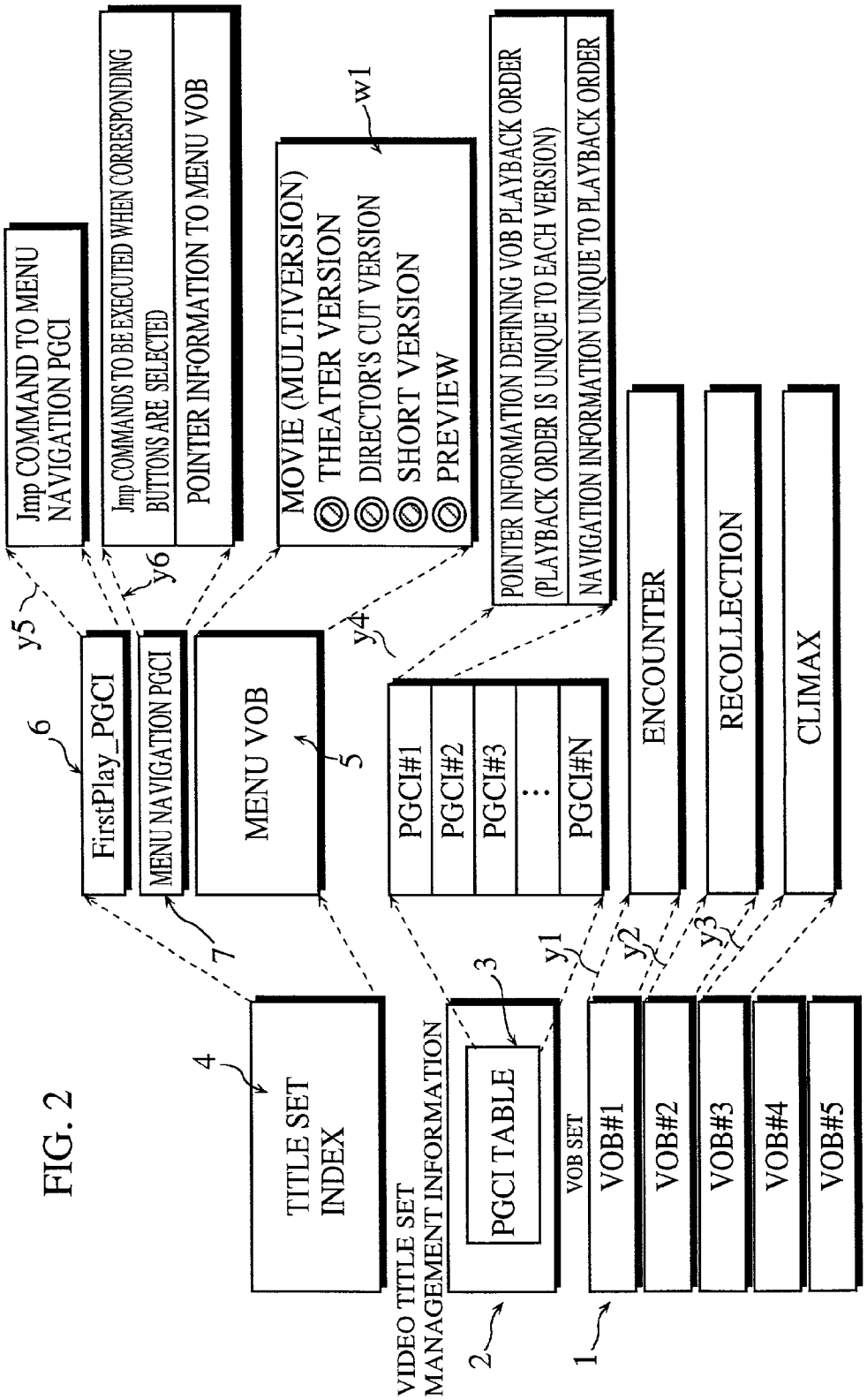
FIG. 2 shows how a video title set is stored on a DVD.

On the CSS-DVD and the EWCPS-DVD, the movie content is treated as titles which each correspond to a different version. Of these titles, a group of those which share the same scenes is called a video title set. For instance, when the movie content recorded on the DVD has several versions like "theater version", "director's cut version", "short version", and "preview", these versions are each treated as a title. Also, they are collectively treated as a video title set, since they share the same scenes. FIG. 2 shows how the video title set is stored on the DVD. This DVD stores the video title set that is made up of a VOB set 1 and video title set management information 2 (including a PGCI table 3), and a title set index 4 (including a menu VOB 5, a First-Play_PGCI 6, and a menu navigation PGCI 7).

The VOB set 1 is made up of a plurality of video objects (VOBs #1, #2, #3, #4, #5, . . . ). A VOB is stream data generated by multiplexing video, audio, and sub-picture streams, and forms a scene which is common to the multiple titles. As shown by guidelines y1, y2, and y3 drawn using broken lines, each VOB corresponds to a different scene (such as "encounter", "recollection", and "climax") of the movie content. Also, several audio and sub-picture streams of different languages such as English, Japanese, and French are included in the stream data, and an audio and sub-picture streams that correspond to a language that has been set in a DVD player are selectively reproduced.

The video title set management information (VTSI) 2 is management information for the video title set, and includes the PGCI table 3.

The PGCI table 3 is a table having a plurality of PGC (program chain) information (PGCIs #1, #2, #3, . . . , #N) corresponding to the multiple titles. Each PGCI defines the playback order of the VOBs for the corresponding title. As shown by guideline y4, each PGCI includes pointer information for the VOBs and playback control information. The pointer information shows which VOBs should be read and the order of reading those VOBs. With this pointer information, the VOBs that should be read and the playback order of those VOBs are indicated to the DVD player for the corresponding title, such as the theater version, the director's cut version, or the short version. Meanwhile, the playback control information defines accessory control that should be exercised by the DVD player, while the VOBs are being played back in the order defined by the pointer information. The playback control information includes UOP (user operation permission) information defining user operations unique to the defined playback order, a command ("Pre Command") which is unique to the defined playback order and is executed before the playback of the VOBs, a command ("Post Command") which is unique to the defined playback order and is executed after the playback of the VOBs, link destination information defining a link to other PGCIs, and cell information defining valid sections in the VOBs for each title.

The title set index 4 (hereafter simply called "index 4") is an index for the video title set, and includes the menu VOB 5, the FirstPlay_PGCI 6, and the menu navigation PGCI 7. These are explained below.

The menu VOB 5 is image data showing a menu. The contents of the menu VOB 5 are shown in box w1. As illustrated, the menu VOB 5 contains the names ("theater version", "director's cut version", "short version", and "preview") of the titles recorded on the DVD, and buttons for accepting selections of these titles.

The FirstPlay_PGCI 6 (hereafter simply called "FP_PGCI 6") is a PGCI which is first executed when the DVD is loaded into the DVD player. As shown by guideline y5, the FP_PGCI 6 includes a jump (Jmp) command that designates the menu navigation PGCI 7 as a jump destination.

The menu navigation PGCI 7 includes pointer information to the menu VOB 5 and a plurality of Jmp commands which should each be executed when a corresponding button in the menu VOB 5 is selected, as shown by guideline y6. Each of these Jmp commands designates a PGCI in the VTSI 2 as a jump destination. Accordingly, by selecting a button in the menu VOB 5, a jump to a corresponding title is executed.

Figure 3:
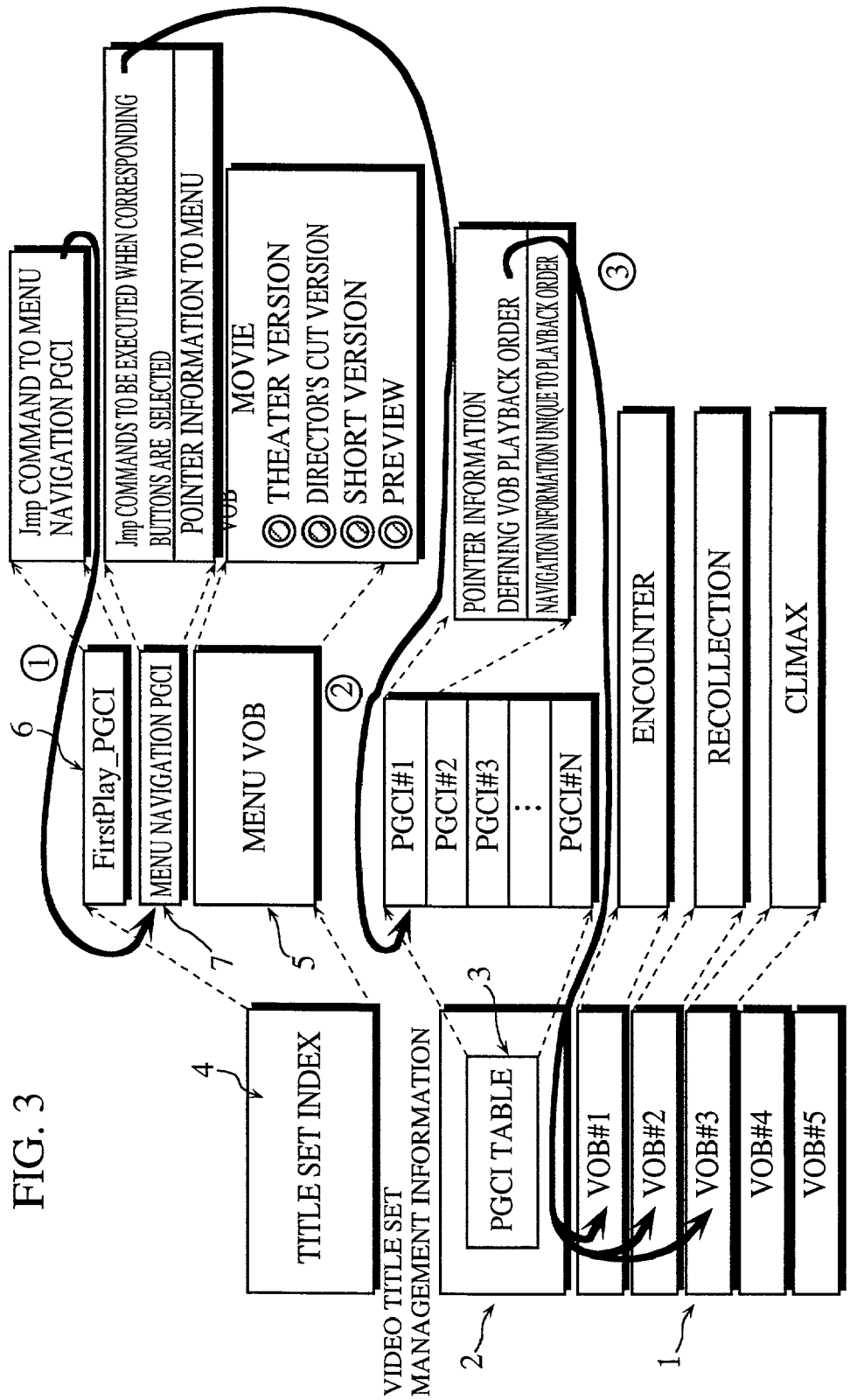
FIG. 3 shows how a title is played back based on Jmp commands included in a FirstPlay_PGCI and menu navigation PGCI.

FIG. 3 shows how a title is played back based on the Jmp commands included in the FP_PGCI 6 and menu navigation PGCI 7. As shown by arrows ①, ②, and ③, the VOBs are specified and played back through the process of ① the Jmp command in the FP_PGCI 6→② a Jmp command in the menu navigation PGCI 7→③ pointer information in a PGCI in the VTSI 2.

Figure 4:
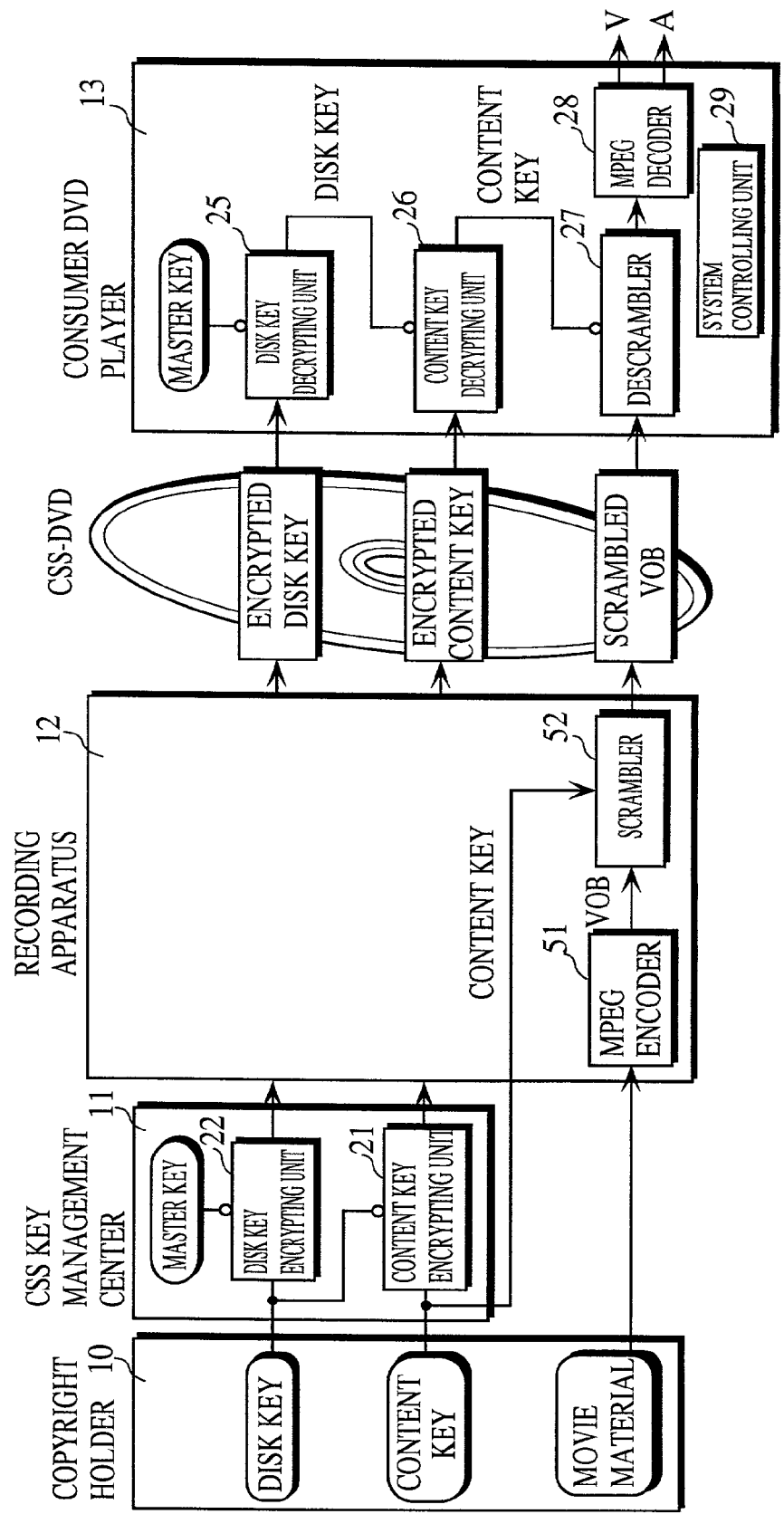
FIG. 4 shows a process of encrypting/decrypting VOBs for a CSS-DVD.

In the video title set having the above structure, the VOBs, which are digitized video, audio, and sub-picture streams, are recorded on the DVD in encrypted form for copyright protection. This encryption of the VOBs is not performed only by the recording apparatus, but is realized by the recording apparatus in conjunction with a copyright holder and a key management center. Such encrypted VOBs are then decrypted by the DVD player. As mentioned above, though the data structure of the video title set does not differ between the EWCPS-DVD and the CSS-DVD, the encryption scheme used for copyright protection for the VOBs differs between the two types of DVDs. A process of encrypting the VOBs to be recorded on the CSS-DVD is explained below, with reference to FIG. 4. As illustrated, the process of encryption/decryption for the CSS-DVD is realized by a copyright holder 10 that produces and distributes the movie content, a CSS key management center 11 operated by a third party for copyright protection, a recording apparatus 12 operated by a DVD manufacturer, and a consumer DVD player 13 operated by a general consumer.

The copyright holder 10 has a movie material (video, audio, and sub-picture materials in analog form), a content key unique to the movie content, and a disk key unique to the DVD. To produce the CSS-DVD, the copyright holder 10 passes the movie material and the content key to the recording apparatus 12, and the disk key and the content key to the CSS key management center 11.

The CSS key management center 11 holds a master key in advance, and includes a content key encrypting unit 21 and a disk key encrypting unit 22. The content key encrypting unit 21 receives the content key from the copyright holder 10, and encrypts it using the disk key received from the copyright holder 10. The disk key encrypting unit 22 encrypts the disk key using the master key. The encrypted disk key and the encrypted content key are then passed to the recording apparatus 12.

The recording apparatus 12 includes an MPEG encoder 51 that encodes the movie material to obtain the original VOBs, and a scrambler 52 that encrypts the VOBs using the content key. The recording apparatus 12 records the scrambled VOBs onto the DVD.

The recording apparatus 12 also records the encrypted content key received from the CSS key management center 11, into a sector header area on the DVD. The recording apparatus 12 further records the encrypted disk key received from the CSS key management center 11, into a lead-in area on the DVD. The sector header area and the lead-in area can be accessed only by DVD players. By recording the encrypted content key and the encrypted disk key to these areas, the recording apparatus 12 prohibits the scrambled VOBs from being descrambled by devices other than DVD players.

The consumer DVD player 13 holds the master key in advance. The consumer DVD player 13 includes a disk key decrypting unit 25, a content key decrypting unit 26, a descrambler 27, an MPEG decoder 28, and a system controlling unit 29. The disk key decrypting unit 25 reads the encrypted disk key from the DVD, and decrypts it using the master key, to obtain the original disk key. The content key decrypting unit 26 reads the encrypted content key from the DVD, and decrypts it using the disk key obtained by the disk key decrypting unit 25. The descrambler 27 reads the scrambled VOBs from the DVD, and decrypts them using the content key to obtain the original VOBs. The MPEG decoder 28 decodes the VOBs and obtains image and audio signals. The system controlling unit 29 reads the VTSI 2 from the DVD, and issues instructions to sequentially read VOBs based on a PGCI included in the VTSI 2.

On the other hand, a process of encryption/decryption for the EWCPS-DVD is as follows.

The EWCPS-DVD and the CSS-DVD are common in that:

(1) the VOBs have been encrypted using the content key;

(2) the content key used for the encryption is recorded on the DVD; and (3) the content key has been encrypted. The two DVDs, however, differ in the following points. On the CSS-DVD, the disk key for decrypting the encrypted content key is recorded on the DVD and supplied to the consumer DVD player 13. On the EWCPS-DVD, on the other hand, a key for decrypting the encrypted content key is called a device key, which is written on an IC card unique to an industrial DVD player and supplied to the industrial DVD player.

The disk key for the CSS-DVD depends on the CSS-DVD, but does not depend on the consumer DVD player 13. Accordingly, the disk key which has once been generated will never be generated again. In contrast, the device key for the EWCPS-DVD depends on the industrial DVD player, and can be generated over and over again. Also, the VOBs recorded on the EWCPS-DVD cannot be played back without the IC card. Furthermore, even if the device key is revealed, a new device key can be generated. Thus, the playback of the VOBs recorded on the EWCPS-DVD is more strictly managed than the CSS-DVD. Note here that the encryption using the device key is based on a public key cipher which employs different keys for encryption (public device key) and decryption (secret device key).

Figure 5:
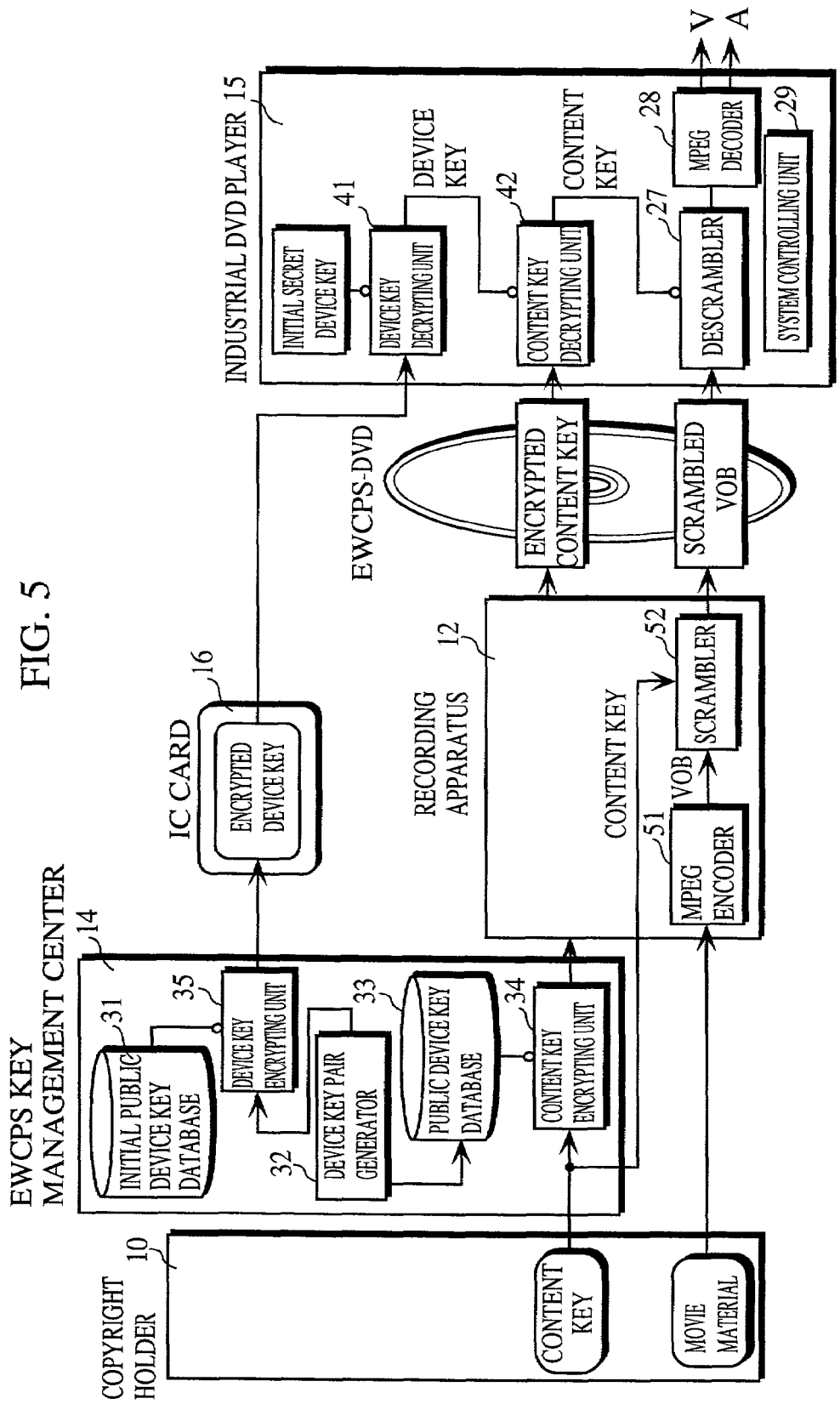
FIG. 5 shows a process of encrypting/decrypting VOBs for an EWCPS-DVD.

The process of encryption/decryption for the EWCPS-DVD is explained in more detail below. FIG. 5 shows the process of encryption/decryption on the EWCPS-DVD. This process is realized by the copyright holder 10 for producing/distributing the movie content, the recording apparatus 12 operated by the DVD manufacturer, an EWCPS key management center 14 operated by a third party for copyright protection, and an industrial DVD player 15 operated by an airline company. The copyright holder 10 has the content key and the movie material, and supplies the content key to the EWCPS key management center 14, as in FIG. 4. Also, the recording apparatus 12 is the same as that shown in FIG. 4. However, the constructions of the EWCPS key management center 14 and industrial DVD player 15 are different with those of the CSS key management center 11 and consumer DVD player 13.

The EWCPS key management center 14 includes an initial public device key database 31, a device key pair generator 32, a public device key database 33, a content key encrypting unit 34, and a device key encrypting unit 35.

The initial public device key database 31 is a database storing x initial public device keys (x being the number of industrial DVD players). The initial public device keys are public keys used in public key encryption, and are paired with initial secret device keys which are respectively stored in the x industrial DVD players. The initial public device keys stored in the initial public device key database 31 are generated when manufacturing the industrial DVD players, and will not be generated again.

The device key pair generator 32 generates x pairs of public device keys and secret device keys for the x industrial DVD players. While the initial public device keys and the initial secret device keys will not be regenerated, the public device keys and the secret device keys can be generated over and over again. For instance, when a secret device key is revealed to an unauthorized party, the device key pair generator 32 regenerates a pair of public and secret device keys.

The public device key database 33 stores the public device keys which are generated by the device key pair generator 32 for the x industrial DVD players. The contents of the public device key database 33 are updated each time a public device key is newly generated by the device key pair generator 32. In other words, the public device key database 33 stores the newest public device keys generated by the device key pair generator 32.

The content key encrypting unit 34 encrypts the content key received from the copyright holder 10, using the x public device keys stored in the public device key database 33. As a result, x encrypted content keys are obtained.

The device key encrypting unit 35 encrypts the x secret device keys generated by the device key pair generator 32, respectively using the x initial public device keys stored in the initial public device key database 31. The device key encrypting unit 35 then writes a corresponding one of the encrypted secret device keys, to an IC card 16 unique to the industrial DVD player 15.

The industrial DVD player 15 includes the descrambler 27, the MPEG decoder 28, and the system controlling unit 29, like the consumer DVD player 13. However, the industrial DVD player 15 differs with the consumer DVD player 13 in that a device key decrypting unit 41 and a content key decrypting unit 42 have replaced the disk key decrypting unit 25 and the content key decrypting unit 26.

The device key decrypting unit 41 reads the encrypted secret device key from the IC card 16, decrypts it using an initial secret device key unique to the industrial DVD player 15, and obtains a secret device key unique to the industrial DVD player 15.

The content key decrypting unit 42 reads the encrypted content key from the DVD, and decrypts it using the secret device key obtained by the device key decrypting unit 41, to obtain the content key.

Thus, though the movie content is recorded on the CSS-DVD and the EWCPS-DVD according to the same data structure shown in FIG. 2, the method of encrypting the VOBs differs between the CSS-DVD and the EWCPS-DVD. Accordingly, if the EWCPS-DVD is loaded to the consumer DVD player 13, the consumer DVD player 13 performs a playback operation in accordance with the FP-PGCI 6, menu navigation PGCI 7, and PGCI in the VTSI 2 recorded on the EWCPS-DVD, but cannot decrypt the VOBs, so that the movie content will not be played back properly. In other words, the consumer DVD player 13 will end up failing to play back the movie in spite of performing a playback operation.

Figure 6:
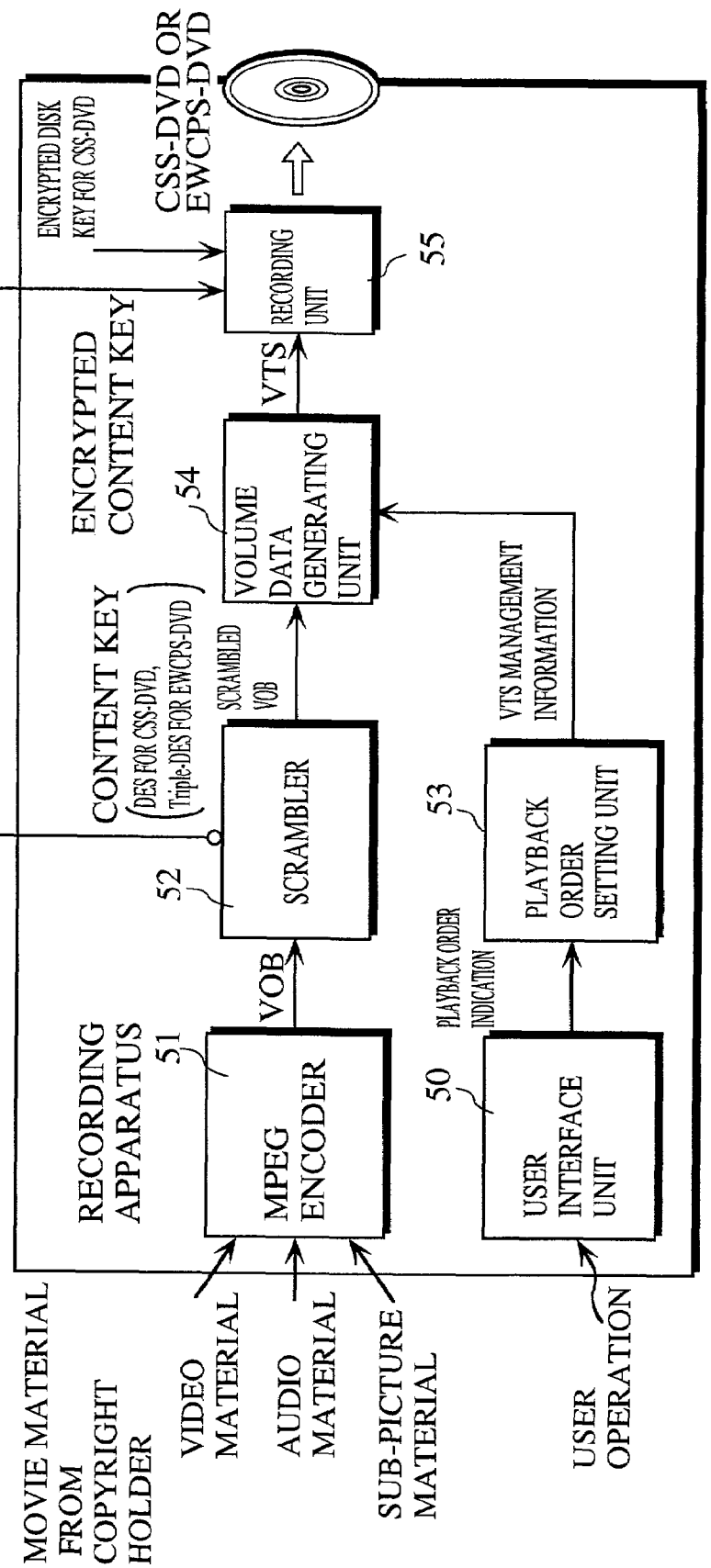
FIG. 6 shows an inner construction of a recording apparatus according to the first embodiment of the invention.

The inner construction of the recording apparatus 12 is explained next, with reference to FIG. 6. As shown in the drawing, the recording apparatus 12 is roughly composed of a user interface unit 50, the MPEG encoder 51, the scrambler 52, a playback order setting unit 53, a volume data generating unit 54, and a recording unit 55.

The user interface unit 50 accepts user operations through a mouse, a keyboard, a slide pad, and the like.

The MPEG encoder 51 compression-codes the video, audio, and sub-picture materials as the movie material, and obtains the video, audio, and sub-picture streams. The MPEG encoder 51 then interleaves/multiplexes these streams to generate the VOBs.

The scrambler 52 scrambles the VOBs using the content key supplied from the copyright holder 10, to obtain the scrambled VOBs. Here, the scrambler 52 performs different encryption depending on whether the VOBs are to be recorded to the CSS-DVD or the EWCPS-DVD. In the case of the CSS-DVD, the scrambler 52 encrypts the VOBs according to DES. The encryption according to DES is to divide each VOB into 8-byte blocks and repeat encrypting each block with the 56-bit content key sixteen times.

In the case of the EWCPS-DVD, the scrambler 52 encrypts the VOBs according to Triple-DES. The encryption according to Triple-DES is to repeat the above DES encryption three times to further strengthen cryptographic security.

The playback order setting unit 53 determines the playback orders of the VOBs which each correspond to a different scene of the movie content, in accordance with user operations accepted by the user interface unit 50. The playback order setting unit 53 then generates the VTSI 2 that includes the PGCIs showing the playback orders.

The volume data generating unit 54 generates volume data. The volume data is data which is used as original data when producing a master of a DVD. The volume data has a hierarchical structure made up of a plurality of directories, each of which stores various data. In this embodiment, the volume data generating unit 54 generates volume data including one or two directories, and writes the VOBs encrypted by the scrambler 52 and the VTSI 2 generated by the playback order setting unit 53, into the directory or one of the two directories as one video title set.

Figure 7:
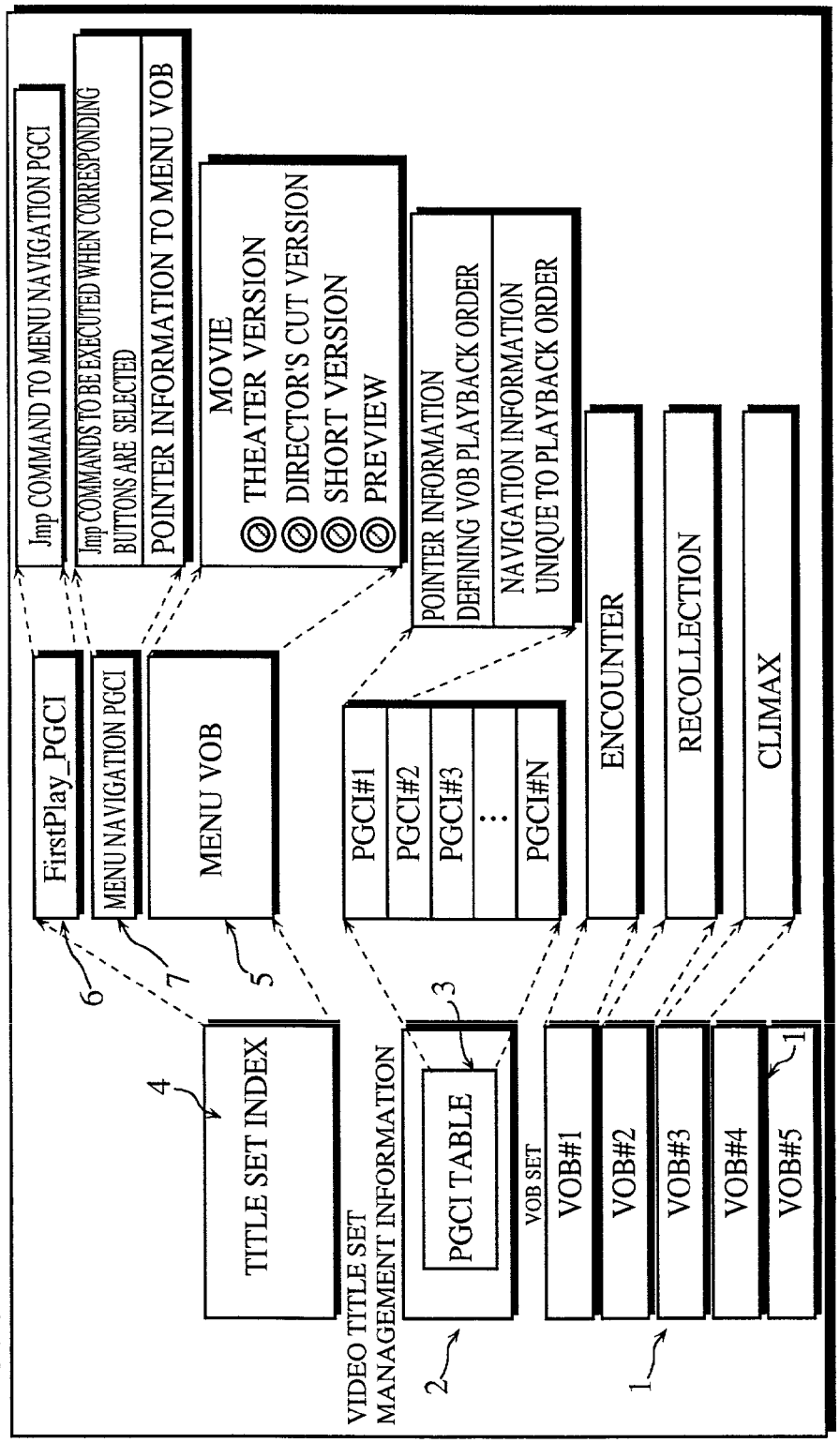
FIG. 7 shows the contents of a VIDEO_TS directory on the CSS-DVD.

The generation of the directory or directories and the writing of the video title set and the index 4 to the directory differ between the CSS-DVD and the EWCPS-DVD. In the case of the CSS-DVD, the volume data generating unit 54 generates volume data including a VIDEO_TS directory, and writes the video title set made up of the VOB set 1 and the VTSI 2 and the index 4 to the VIDEO_TS directory. The VIDEO_TS directory here is a directory that is arranged to be accessed by the consumer DVD player 13. When the CSS-DVD is loaded to the consumer DVD player 13, the consumer DVD player 13 first executes the FP_PGCI 6 in the VIDEO_TS directory, and then plays back a title included in the video title set. FIG. 7 shows the storage contents of the VIDEO_TS directory of the CSS-DVD. In the drawing, the video title set (made up of the VOB set 1 and the VTSI 2) and the index 4 are written in the VIDEO_TS directory.

In the case of the EWCPS-DVD, the volume data generating unit 54 records the video title set and the index 4 in the following way. The volume data generating unit 54 generates volume data including a VIDEO_TS directory and an EWCPS_TS directory, and records the video title set (made up of the VOB set 1 and the VTSI 2) and the index 4 to the EWCPS_TS directory. The EWCPS_TS directory is a directory that is arranged to be accessed by the industrial DVD player 15. When the EWCPS-DVD is loaded to the industrial DVD player 15, the industrial DVD player 15 first executes the FP_PGCI 6 in the EWCPS_TS directory, and then plays back a title included in the video title set. Thus, the video title set is not written to the VIDEO_TS directory in the case of the EWCPS-DVD. FIG. 8 shows the storage contents of the VIDEO_TS directory and EWCPS_TS directory on the EWCPS-DVD. In the drawing, the video title set (made up of the VOB set 1 and the VTSI 2) and the index 4 are written in the EWCPS_TS directory, whereas an index 60 is written in the VIDEO_TS directory. Since the video title set which forms the movie content is written in the EWCPS_TS directory, even if a person with bad intentions steals the EWCPS-DVD from the airplane and loads it to the consumer DVD player 13, he or she cannot reproduce the movie content. In addition, since the VOB set 1 has been encrypted using a cipher different with the CSS-DVD, the movie content cannot be reproduced even if a device such as a personal computer, that can access the EWCPS_TS directory is used.

The index 60 recorded in the VIDEO_TS directory on the EWCPS-DVD has the following structure. The index 60 includes a FP_PGCI 61, a message navigation PGCI 62, and a message VOB 63. The FP_PGCI 61 contains a Jmp command that designates the message navigation PGCI 62 as a jump destination, as shown by guideline h1. The message navigation PGCI 62 includes pointer information to the message VOB 63 as shown by guideline h2, and serves as a PGCI for displaying the message VOB 63. The message VOB 63 is message data indicating that the video title set recorded on the EWCPS-DVD cannot be played back by the consumer DVD player 13, as shown by guideline h3.

Since the pointer information of the message navigation PGCI 62 refers to the message VOB 63, and the FP_PGCI 61 designates the message navigation PGCI 62 as the jump destination, if this EWCPS-DVD is loaded to the consumer DVD player 13 by mistake, the message VOB 63 is automatically displayed. In this way, the user is informed of the reason why the movie content cannot be played back, and therefore will not suspect the EWCPS-DVD or the consumer DVD player 13 to be faulty. Though the message VOB 63 in the drawing is a character string written in a single language, the message VOB 63 may be a multilingual message that contains several character strings written in different languages. Here, each of these character strings indicates that the playback of the movie content by the consumer DVD player 13 is impossible. In this way, the message of the message VOB 63 can be conveyed to many passengers from different countries. The consumer DVD player 13 may display these character strings in different languages on the menu all at once, or display only a character string that corresponds to a language set in the consumer DVD player 13.

Figure 9:
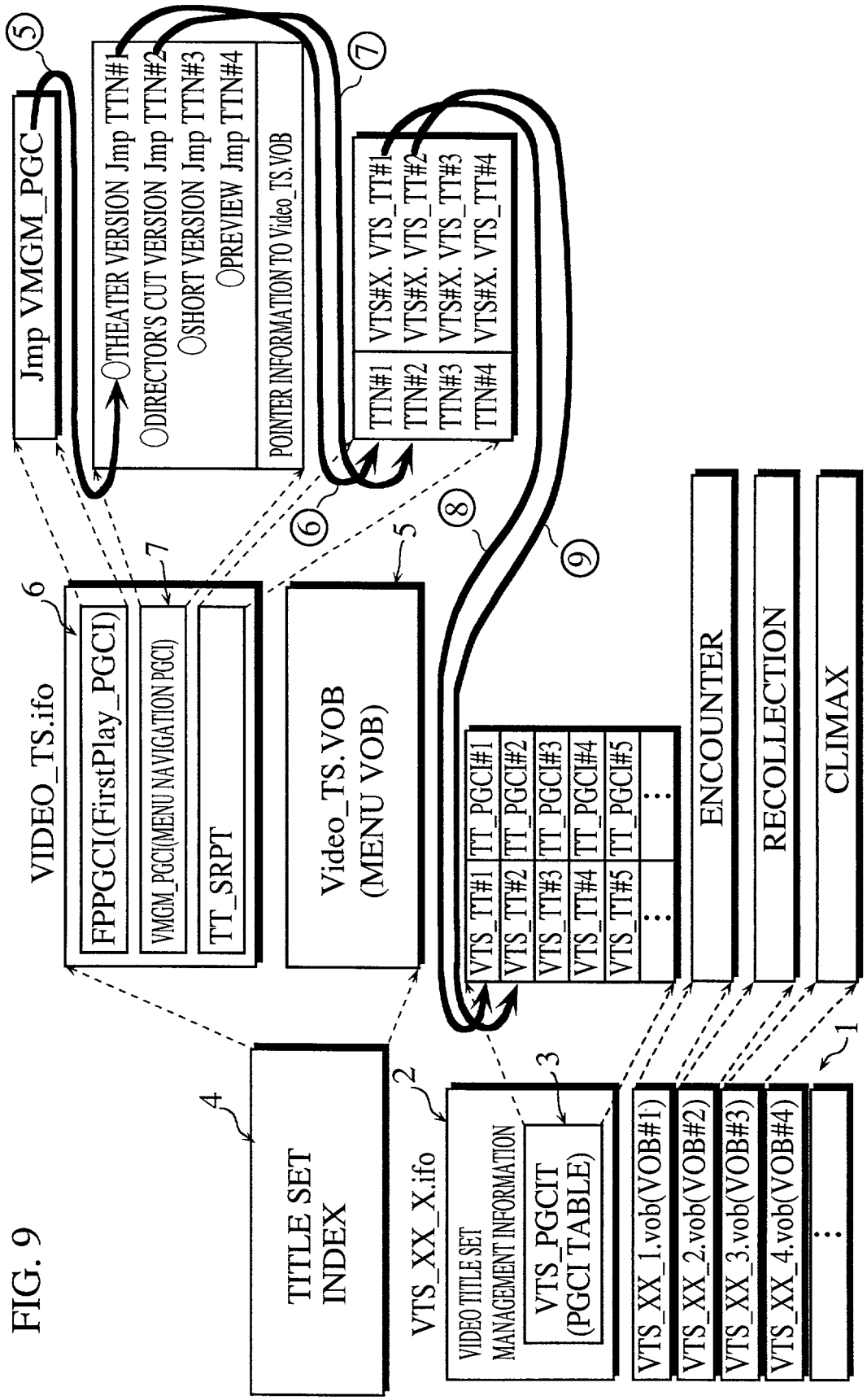
FIG. 9 shows a file structure of the VIDEO_TS directory shown in FIG. 7.

The video title set and the index 4 are recorded to the VIDEO_TS directory in FIG. 7 or the EWCPS_TS directory in FIG. 8, according to a file structure that complies with the DVD-Video standard. The following explains how the data is written to the VIDEO_TS directory in FIG. 7 or the EWCPS_TS directory in FIG. 8 according to the file structure of the DVD_Video standard. FIG. 9 shows a file structure of the VIDEO_TS directory shown in FIG. 7.

Under the DVD-Video standard, each VOB is contained in a file with a filename VTS_XX_X.vob. Here, XX is a video title set number, and X (1, 2, 3, 4, . . . in the drawing) is a VOB number.

Also, the VTSI 2 is contained in a file with a filename VTS_XX_X.ifo. Here, XX is the video title set number, and X is a VTSI number. The PGCI table 3 included in the VTSI 2 is called a VTS_PGCIT. Each PGCI included in the VTS_PGCIT is called a TT_PGCI, and is associated with a title number (VTS_TT #1, #2, #3, #4, #5, ) to show which PGCI corresponds to which title in the video title set.

Meanwhile, the menu VOB 5 is contained in a file with a filename Video_TS.VOB. The menu displayed by the menu VOB 5 is called a Video ManaGer Menu (VMGM).

The FP_PGCI 6 and the menu navigation PGCI 7 are contained in a file with a filename VIDEO_TS.ifo. The VIDEO_TS.ifo also contains a Title_Search_Pointer (TT_SRPT). A jump destination of each Jmp command in the menu navigation PGCI 7 is designated using a number called TiTle_Number (TTN). The TT_SRPT is a table that associates the VTS number (VTS #X) and the title numbers (VTS_TT #1, #2, #3, #4, . . . ) in the video title set, with the TTNs designated by the Jmp commands of the menu navigation PGCI 7. By referring to the TT_SRPT, it is possible to specify which title in which video title set is designated by a Jmp command as a jump destination.

Figure 10:
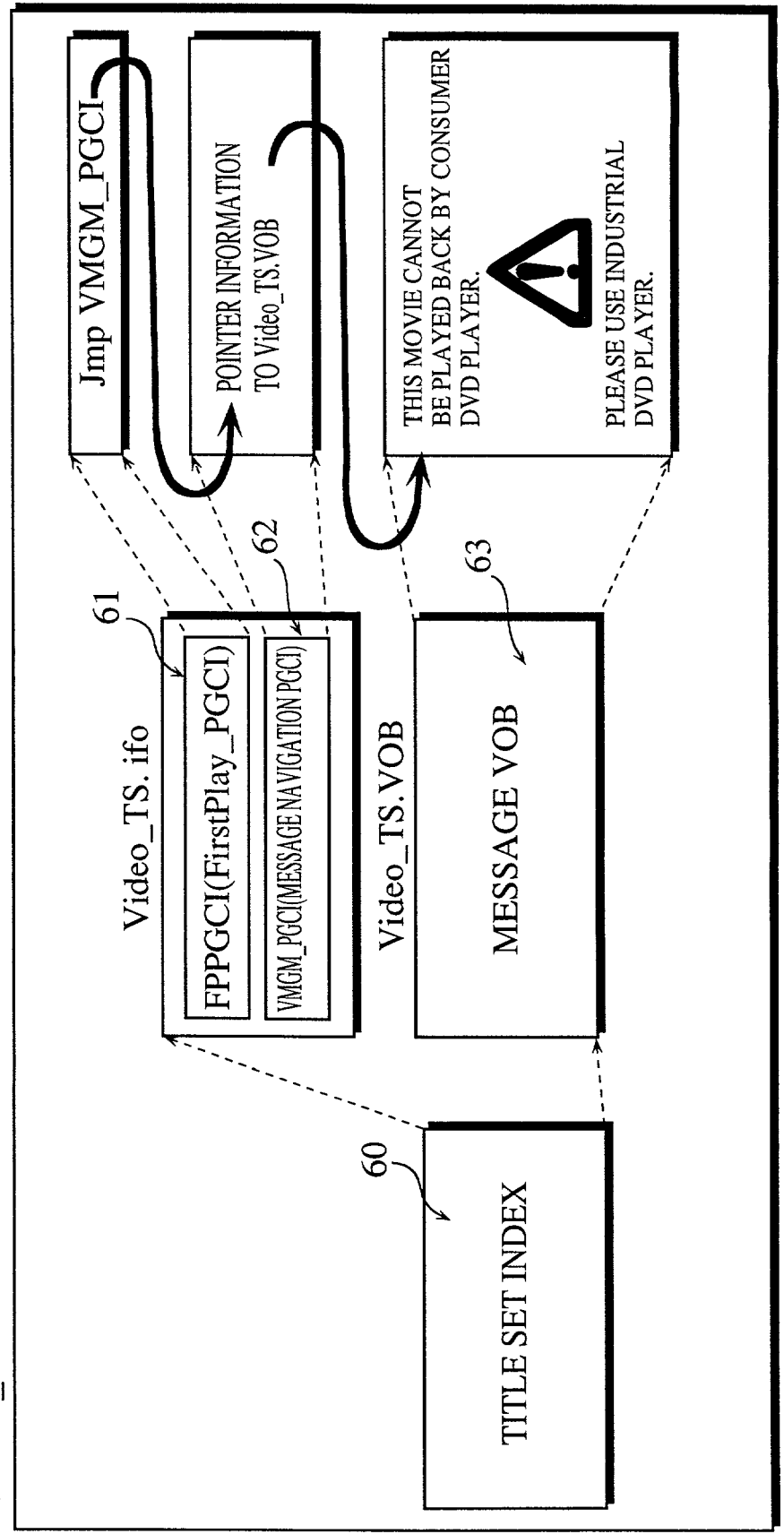
FIG. 10 shows a file structure of the VIDEO_TS directory shown in FIG. 8.

The index 60 in the VIDEO_TS directory shown in FIG. 8 is also recorded according to a file structure that complies with the DVD-Video standard. The following explains how the index 60 is recorded in the VIDEO_TS directory of the EWCPS-DVD according to the file structure of the DVD-Video standard. FIG. 10 shows a file structure of the VIDEO_TS directory on the EWCPS-DVD. Under the DVD-Video standard, the message VOB 63 is contained in a file with a filename Video_TS.VOB.

The FP_PGCI 61 and the message navigation PGCI 62 are contained in a file with a filename Video_TS.ifo. The FP_PGCI 61 includes a Jmp command that designates the message navigation PGCI 62 (VMGM_PGCI) as a jump destination, and the message navigation PGCI 62 has pointer information to the Video_TS.VOB. By tracing these Jmp command and pointer information, the message VOB 63 is displayed. This completes the explanation of the volume data generating unit 54.

The recording unit 55 records the volume data generated by the volume data generating unit 54, to the CSS-DVD together with the encrypted content key and encrypted disk key received from the CSS key management center 11, or to the EWCPS-DVD together with the encrypted content key received from the EWCPS key management center 14. Thus, the master DVD is produced. The DVD manufacturer then launches mass production for DVDs, using the master DVD.

Figure 11:
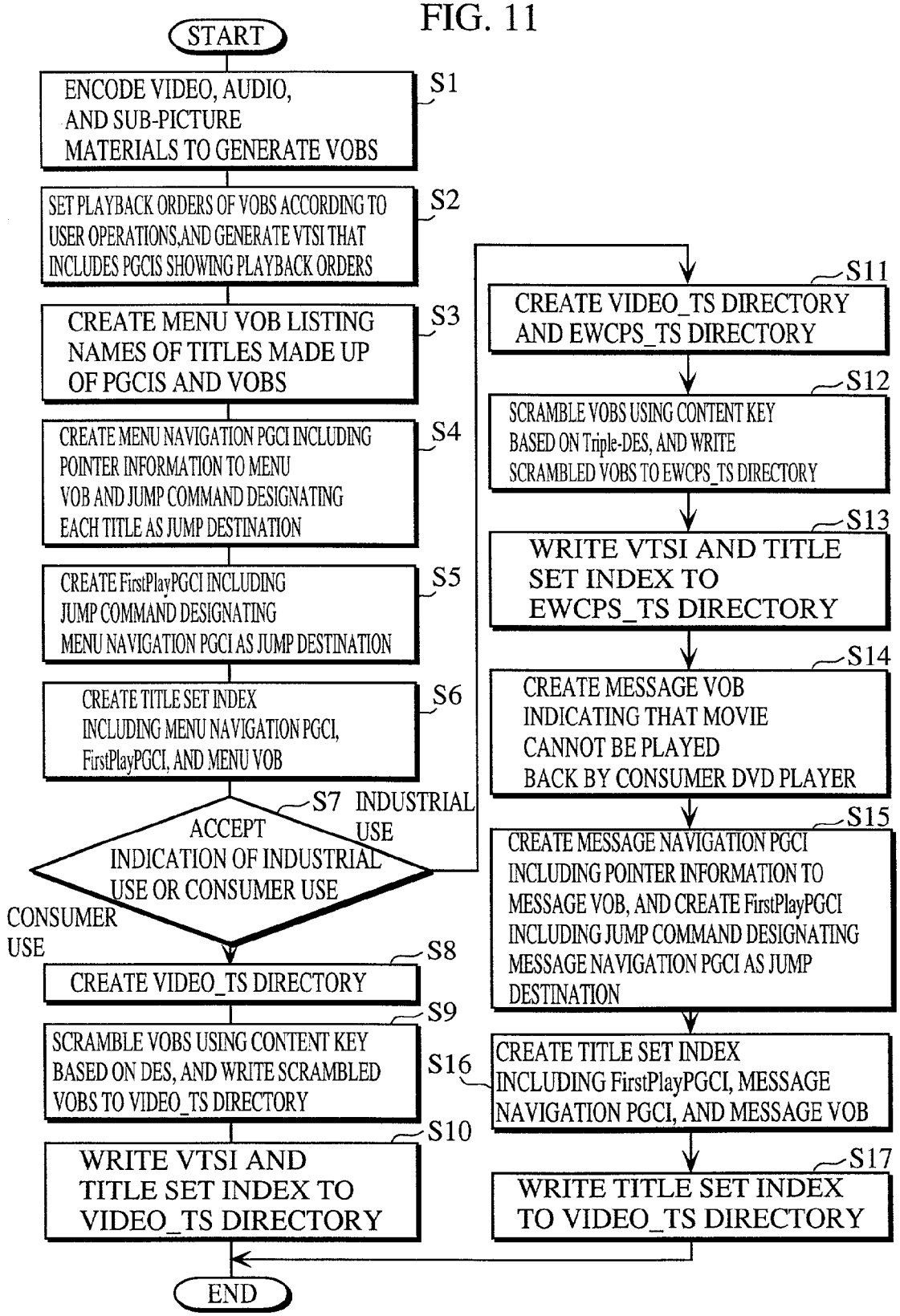
FIG. 11 is a flowchart showing an operation of the recording apparatus.
Figure 12:
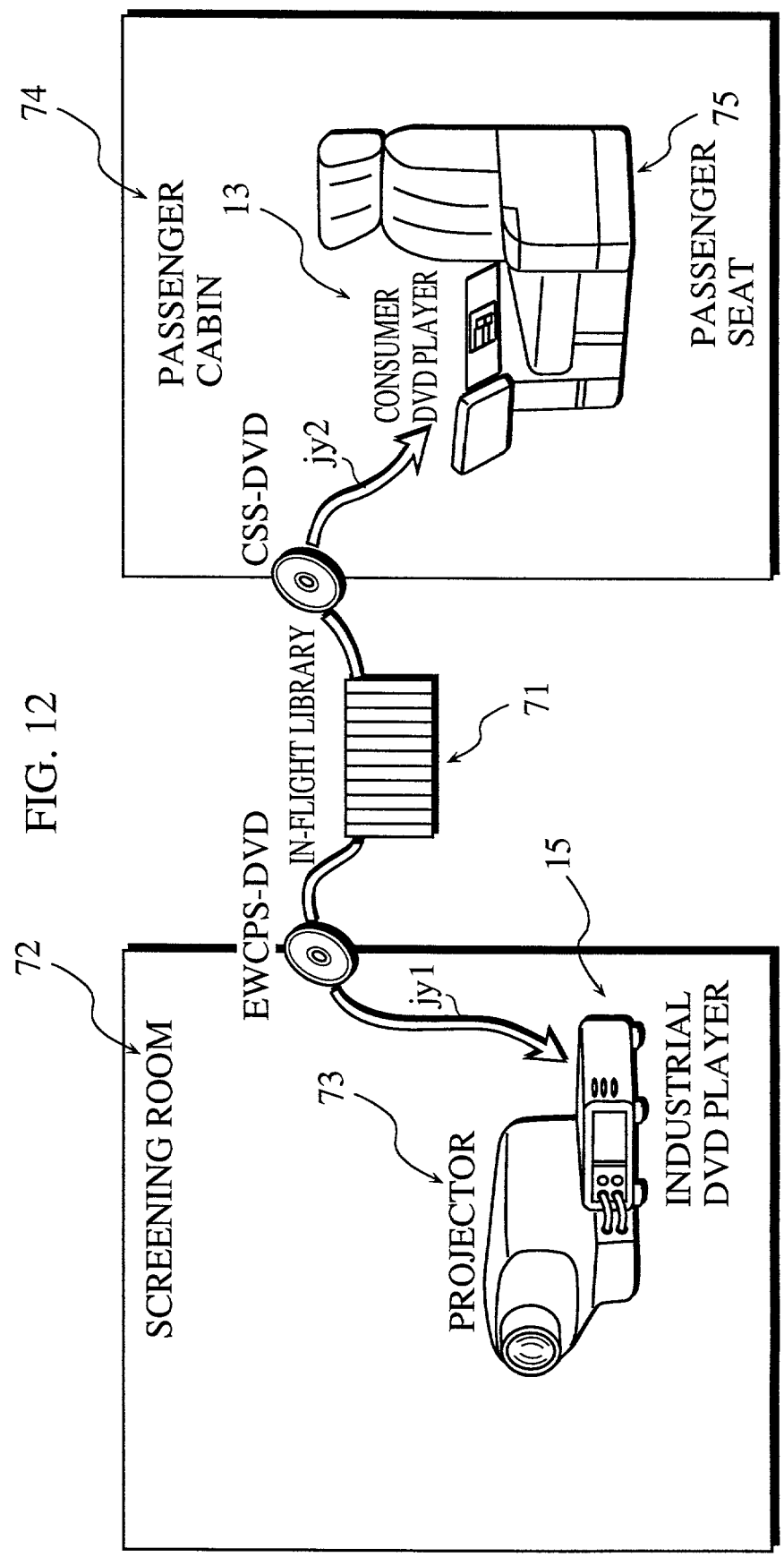
FIG. 12 shows the inside of an airplane where a consumer DVD player and an industrial DVD player are equipped.

FIG. 11 is a flowchart showing an operation of the above constructed recording apparatus 12. The operation of the recording apparatus 12 is explained below, with reference to the drawing.

The MPEG encoder 51 encodes the video, audio, and sub-picture materials to obtain the VOBs (S1).

The playback order setting unit 53 determines the playback orders of the VOBs in accordance with user operations, and generates the VTSI 2 including the PGCIs showing the playback orders (S2). The volume data generating unit 54 creates the menu VOB 5 for displaying a list of the names of the titles (S3). The volume data generating unit 54 also creates the menu navigation PGCI 7 that includes the pointer information to the menu VOB 5 and the Jmp commands which each designate a different title as a jump destination (S4), and creates the FP_PGCI 6 that includes the Jmp command designating the menu navigation PGCI 7 as the jump destination (S5). The volume data generating unit 54 forms the index 4 from the menu VOB 5, the FP_PGCI 6, and the menu navigation PGCI 7 (S6).

The user interface unit 50 accepts a user indication as to whether a DVD is intended for industrial use or consumer use (S7). In the case of consumer use, the volume data generating unit 54 creates the VIDEO_TS directory (S8). The scrambler 52 scrambles the VOBs using the content key based on DES, and writes the scrambled VOBs to the VIDEO_TS directory (S9). The volume data generating unit 54 writes the VTSI 2 and the index 4 to the VIDEO_TS directory (S10). The resulting contents of the VIDEO_TS directory are shown in FIG. 7.

In the case of industrial use, on the other hand, the volume data generating unit 54 creates the VIDEO_TS directory and the EWCPS_TS directory (S11). The scrambler 52 scrambles the VOBs using the content key based on Triple-DES, and writes the scrambled VOBs to the EWCPS_TS directory (S12). The volume data generating unit 54 writes the VTSI 2 and the index 4 to the EWCPS_TS directory (S13). The volume data generating unit 54 also creates the message VOB 63 indicating that the playback of the movie content by the consumer DVD player 13 is impossible (S14). The volume data generating unit 54 creates the message navigation PGCI 62 including the pointer information to the message VOB 63, and the FP_PGCI 61 including the Jmp command that designates the message navigation PGCI 62 as the jump destination (S15).

The volume data generating unit 54 forms the index 60 from the FP_PGCI 61, the message navigation PGCI 62, and the message VOB 63 (S16), and writes it to the VIDEO_TS directory (S17). The resulting contents of the EWCPS_TS directory and VIDEO_TS directory on the EWCPS-DVD are shown in FIG. 8.

FIGS. 12-15 show how the CSS-DVD and EWCPS-DVD recorded by the recording apparatus 12 are utilized on the airplane. The drawings show the inside of the airplane where the consumer DVD player 13 and the industrial DVD player 15 are equipped. In the drawings, several CSS-DVDs and EWCPS-DVDs recorded by the recording apparatus 12 are stored in an in-flight library 71. Also, the industrial DVD player 15 connected to a projector 73 is equipped in an in-flight screening room 72, and the consumer DVD player 13 is equipped in a passenger seat 75 in a passenger cabin 74. Suppose an EWCPS-DVD and a CSS-DVD stored in the library 71 are respectively loaded to the industrial DVD player 15 in the screening room 72 and the consumer DVD player 13 in the passenger cabin 74 as indicated by arrows jy1 and jy2. In this case, the movie content recorded on the EWCPS-DVD and the CSS-DVD are properly played back as shown in FIG. 13.

Figure 14:
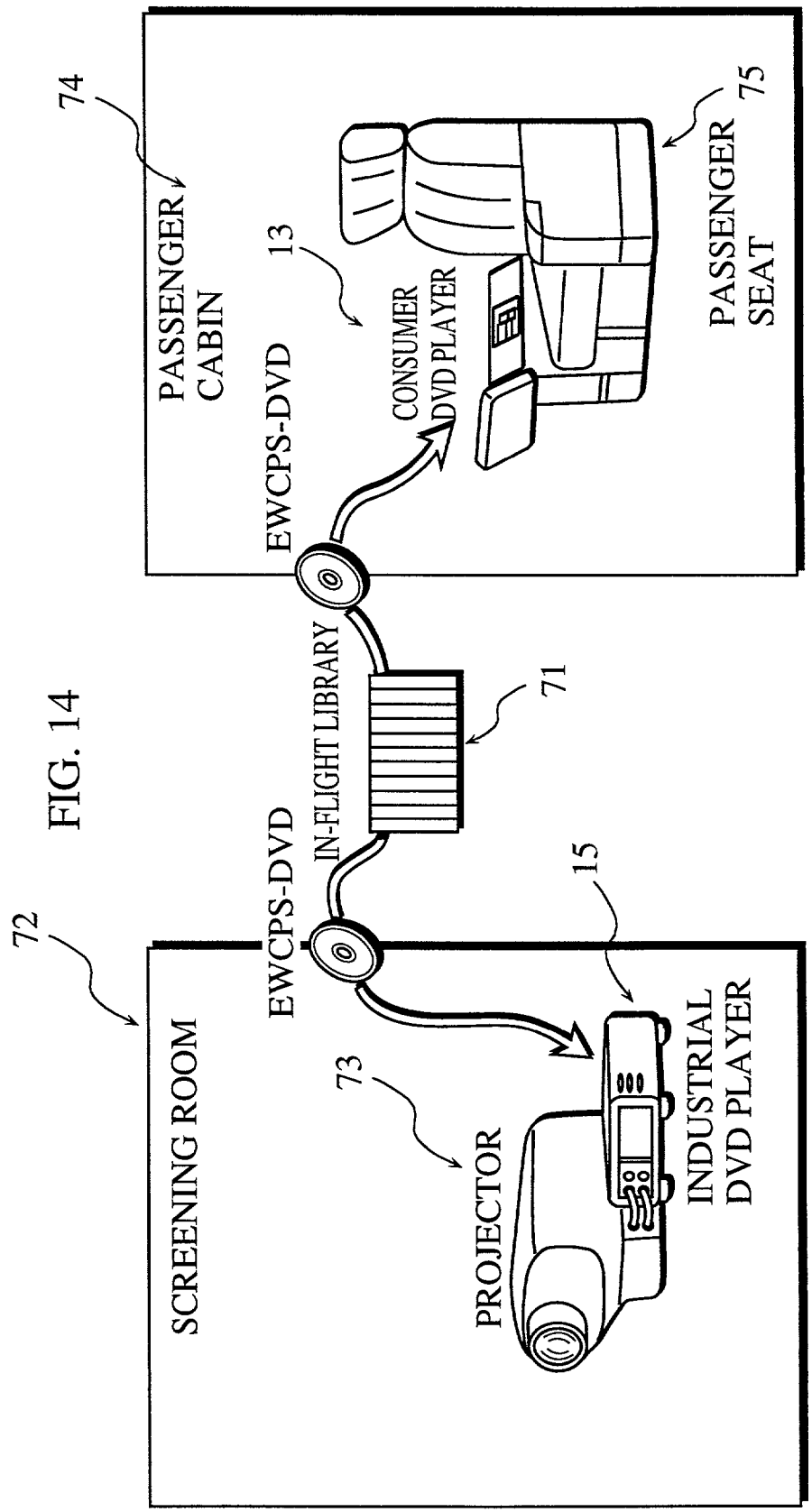
FIG. 14 shows the inside of the airplane where the consumer DVD player and the industrial DVD player are equipped.

Suppose an EWCPS-DVD stored in the library 71 is mistakenly taken to the passenger cabin 74 and loaded to the consumer DVD player 13, as shown in FIG. 14. In this case, the consumer DVD player 13 does not reproduce a title contained in the EWCPS_TS directory, but executes the FP_PGCI 61 and the message navigation PGCI 62 in the VIDEO_TS directory in sequence. As a result, the message VOB 63 indicating that the playback by the consumer DVD player 13 is impossible is displayed. FIG. 15 shows the consumer DVD player 13 when the message VOB 63 is displayed. Thus, even when the EWCPS-DVD is mistakenly loaded to the consumer DVD player 13, the consumer DVD player 13 informs the passenger that the movie content recorded on the EWCPS-DVD cannot be played back, so that the passenger can understand that the loaded DVD is not a consumer DVD.

Though the industrial DVD player 15 is equipped in the screening room in the above example, it may be equipped in a first-class or business-class passenger cabin. Also, the VIDEO_TS directory of the CSS-DVD and the EWCPS_TS directory of the EWCPS-DVD may store different video title sets.

Second Embodiment

In the first embodiment, the EWCPS_TS directory and the VIDEO_TS directory are created and the video title set is written to the EWCPS-TS directory, when recording the EWCPS-DVD. In the second embodiment, only the VIDEO_TS directory is created and the video title set is written to the VIDEO_TS directory, when recording the EWCPS-DVD.

Figure 16:
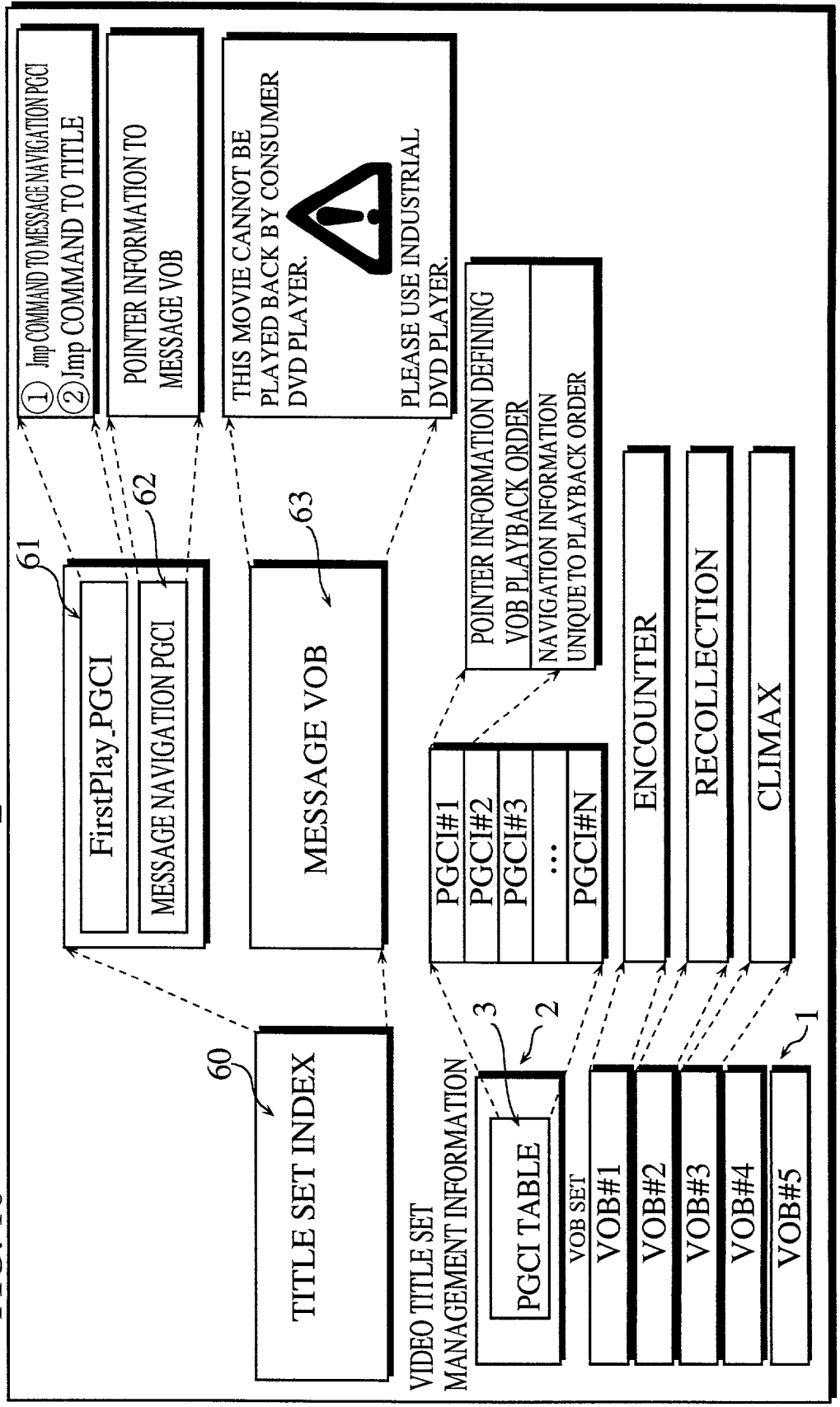
FIG. 16 shows a structure of a VIDEO_TS directory according to the second embodiment of the invention.

FIG. 16 shows a structure of the VIDEO_TS directory on the EWCPS-DVD in the second embodiment. In the drawing, the message VOB 63 indicates that the movie content cannot be played back by the consumer DVD player 13. The message navigation PGCI 62 is a PGCI including pointer information to the message VOB 63. The FP_PGCI 61 has a first entry area and a second entry area. The first entry area is an area which is first accessed by the consumer DVD player 13 when the DVD is loaded to the consumer DVD player 13. The second entry area is an area which is first accessed by the industrial DVD player 15 when the DVD is loaded to the industrial DVD player 15. In the case of the CSS-DVD, a Jmp command designating a title in the video title set as a jump destination is written to the first entry area, while no Jmp command is written to the second entry area. In the case of the EWCPS-DVD, a Jmp command designating the message navigation PGCI 62 as a jump destination is written to the first entry area, and a Jmp command designating a title in the video title set as a jump destination is written to the second entry area, as shown in FIG. 16.

When the EWCPS-DVD having the above data structure is loaded to the consumer DVD player 13, the consumer DVD player 13 accesses the index 60 in the following manner. When the EWCPS-DVD is loaded, the consumer DVD player 13 executes the Jmp command written in the first entry area in the FP_PGCI 61 in the VIDEO_TS directory. This Jmp command designates the message navigation PGCI 62 as the jump destination, and the message navigation PGCI 62 has the pointer information to the message VOB 63, as a result of which the message VOB 63 is displayed.

On the other hand, when the EWCPS-DVD is loaded to the industrial DVD player 15, the industrial DVD player 15 ignores the Jmp command in the first entry area and executes the Jmp command in the second entry area in the FP_PGCI 61. This Jmp command designates the title in the video title set as the jump destination, as a result of which the title is played back.

Here, it is desirable to prohibit acceptance of user operations, by using UOP information included in the FP_PGCI 61 or the message navigation PGCI 62. In so doing, even when a user operation is made during the execution of the FP_PGCI 61 or message navigation PGCI 62, the consumer DVD player 13 will be kept from performing some kind of playback operation according to the user operation.

The video title set shown in FIG. 16 is recorded to the VIDEO_TS directory of the EWCPS-DVD, according to a file structure which complies with the DVD-Video standard.

Figure 17:
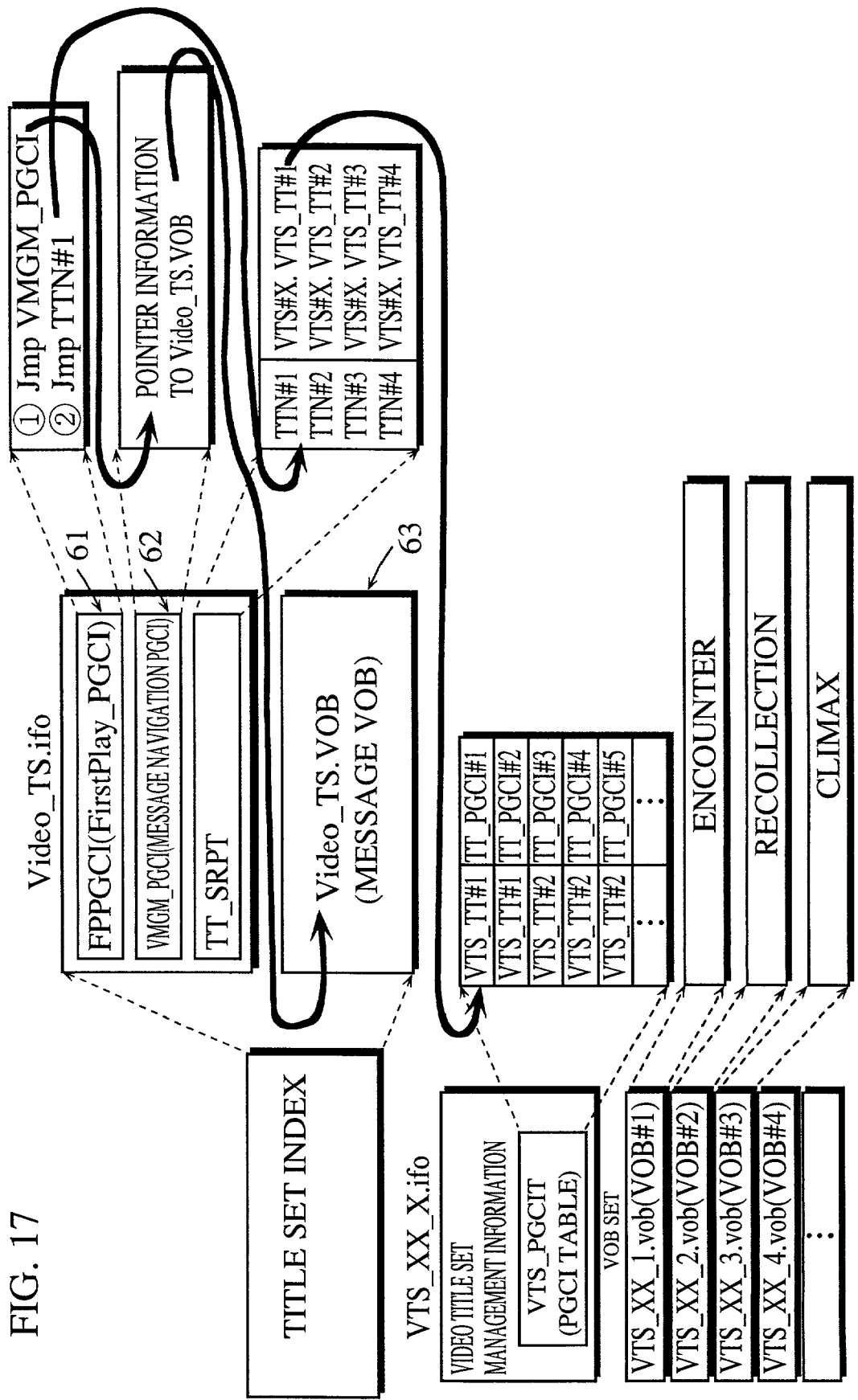
FIG. 17 shows a file structure of the VIDEO_TS directory shown in FIG. 16.

The following explains how the data is recorded to the VIDEO_TS directory according to the file structure of the DVD-Video standard. FIG. 17 shows a file structure of the VIDEO_TS directory on the EWCPS-DVD. The FP_PGCI 61 includes a Jmp command "Jmp VMGM_PGCI" and a Jmp command "Jmp TTN #1", and the message navigation PGCI 62 has the pointer information to the Video_TS.VOB. The Jmp command "Jmp VMGM_PGCI" designates the VMGM_PGCI as the jump destination, whereas the Jmp command "Jmp TTN #1" designates the TTN #1 as the jump destination. Accordingly, when the consumer DVD player 13 executes the Jmp command "Jmp VMGM_PGCI", the message VOB is displayed. Also, when the industrial DVD player 15 ignores the Jmp command "Jmp VMGM_PGCI" and executes the Jmp command "Jmp TTN #1", the title is played back.

The present invention has been described by way of the above embodiments, though these embodiments are mere examples of systems that are presently expected to operate favorably. It should be obvious that various modifications can be made without departing from the technical scope of this invention. Ten representative examples of such modifications are given below.

(A) The first and second embodiments describe the case where the industrial DVD player 15 plays back only the EWCPS-DVD, but the industrial DVD player 15 may play back the CSS-DVD if the user performs a predetermined operation to the industrial DVD player 15.

(B) The message VOB in the first and second embodiments may be made as follows: "This movie cannot be played back in the passenger seat. Please see the movie in the screening room".

(C) The second embodiment describes the case where the industrial DVD player 15 ignores the command in the first entry area in the FP_PGCI 61, but a command in the second entry area or another entry area may be ignored.

(D) The VOBs to be recorded on the DVD for in-flight screening were described as being encrypted according to the EWCPS scheme, but they may be encrypted according to the CSS scheme and the same effects can be produced. Also, they may be recorded without being encrypted.

(E) The second embodiment describes the case where the command written in the first entry area in the FP_PGCI 61 designates the message VOB as the jump destination, but the message VOB may be played back indirectly through a given number of commands.

(F) The first embodiment describes the case where the name of the directory first accessed by the industrial DVD player 15 is the EWCPS_TS directory, but the directory may be of a different name.

(G) The first and second embodiments describe the case where the message VOB is played back when the EWCPS-DVD is loaded to the consumer DVD player 13. Here, a preview or digest image of the movie may be played back together with the message VOB.

(H) The first and second embodiments describe the case when the invention is used for a DVD, though this is not a limit for the invention, which may be used in any kind of recording medium in which playback of VOBs is controlled using management information attached to the VOBs.

(I) The procedure shown in the flowchart in FIG. 11 can be achieved by a machine language program. Such a machine language program may be distributed and sold having been recorded on a storage medium. Examples of such a storage medium are an IC card, an optical disk, or a floppy disk. The machine language program recorded on the storage medium may then be installed into a standard computer. By executing the installed machine language program, the standard computer can achieve the functions of the recording apparatus of the above embodiments.

(J) The first and second embodiments take movie content as an example, but the invention is applicable to any kind of content which has been digitized. Also, content for industrial use was described as being used in the airplane, though it may also be used in a ship, a train, or a car.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An optical disk for having digital content recorded thereon, the optical disk comprising:
 a first directory including message video data, the message video data including a warning message which is displayed by a consumer reproduction apparatus when the message video data is reproduced by the consumer reproduction apparatus; and
 a second directory including the digital content, the digital content having been recorded in an encrypted form which can be decrypted by an industrial reproduction apparatus and cannot be decrypted by the consumer reproduction apparatus,
 wherein the first directory has a name that is the same as a name of a directory of a conventional optical disk to be reproduced by the consumer reproduction apparatus, and the second directory has a name that is different from the name of the first directory, and
 wherein the name of the first directory is VIDEO_TS.

2. A recording method for recording digital content in an optical disk, the recording method comprising:
 producing a first directory on the optical disk, the first directory having a name that is the same as a name of a directory of a conventional optical disk to be reproduced by a consumer reproduction apparatus;
 recording message video data into the first directory, the message video data including a warning message which is displayed by the consumer reproduction apparatus when the message video data is reproduced by the consumer reproduction apparatus;
 producing a second directory on the optical disk, the second directory having a name that is different from the name of the first directory; and
 recording the digital content into the second directory in an encrypted form which can be decrypted by an industrial reproduction apparatus and cannot be decrypted by the consumer reproduction apparatus,
 wherein the name of the first directory is VIDEO_TS.

3. A recording apparatus for recording digital content in an optical disk, the recording apparatus comprising:
 a first producing unit operable to produce a first directory on the optical disk, the first directory having a name that is the same as a name of a directory of a conventional optical disk to be reproduced by a consumer reproduction apparatus;
 a first recording unit operable to record message video data into the first directory, the message video data including a warning message which is displayed by the consumer reproduction apparatus when the message video data is reproduced by the consumer reproduction apparatus;

a second producing unit operable to produce a second directory on the optical disk, the second directory having a name that is different from the name of the first directory; and a second recording unit operable to record the digital content into the second directory in an encrypted form which can be decrypted by an industrial reproduction apparatus and cannot be decrypted by the consumer reproduction apparatus, wherein the name of the first directory is VIDEO_TS.

4. A reproduction method for reproducing an optical disk having digital content recorded thereon, the reproduction method comprising:

when the optical disk is loaded in a consumer reproduction apparatus:

reading message video data including a warning message from a first directory of the optical disk, the first directory having a name that is the same as a name of a directory of a conventional optical disk to be reproduced by the consumer reproduction apparatus; and reproducing the warning message; and when the optical disk is loaded in an industrial reproduction apparatus:

reading the digital content from a second directory of the optical disk, the second directory having a name that is different from the name of the first directory and the digital content having been recorded in an encrypted form which cannot be decrypted by the consumer reproduction apparatus; and reproducing the digital content, wherein the name of the first directory is VIDEO_TS.

* * * * *